(12) United States Patent
Kuo

(10) Patent No.: US 9,825,681 B2
(45) Date of Patent: Nov. 21, 2017

(54) COMMUNICATION STATION WITH ELEVATION BEAMFORMING AND RELATED COMMUNICATION DEVICE

(71) Applicant: Industrial Technology Research Institute, Hsinchu County (TW)

(72) Inventor: Ping-Heng Kuo, New Taipei (TW)

(73) Assignee: Industrial Technology Research Insitute, Hsinchu (TW)

( * ) Notice: Subject to any disclaimer, the term of this patent is extended or adjusted under 35 U.S.C. 154(b) by 183 days.

(21) Appl. No.: 14/247,824

(22) Filed: Apr. 8, 2014

(65) Prior Publication Data

US 2014/0301310 A1 Oct. 9, 2014

Related U.S. Application Data

(60) Provisional application No. 61/809,434, filed on Apr. 8, 2013.

(51) Int. Cl.
*H04B 7/06* (2006.01)
*H04L 5/00* (2006.01)

(52) U.S. Cl.
CPC ......... *H04B 7/0626* (2013.01); *H04B 7/0617* (2013.01); *H04L 5/0048* (2013.01)

(58) Field of Classification Search
CPC ...... H04B 7/0626; H04B 7/617; H04L 5/0048
See application file for complete search history.

(56) References Cited

U.S. PATENT DOCUMENTS

2013/0242773 A1* 9/2013 Wernersson ............ H04B 7/024
370/252

2014/0192762 A1* 7/2014 Li ..................... H04L 25/03929
370/329

FOREIGN PATENT DOCUMENTS

| CN | 101013917 | 8/2007 |
|---|---|---|
| CN | 101854724 | 10/2010 |

(Continued)

OTHER PUBLICATIONS

ZTE, "Discussion on scenarios of 3D beamforming and Massive MIMO", 3GPP TSG RAN WG1 Meeting #72, R1-130140, Jan. 2013, pp. 1-3.*

(Continued)

*Primary Examiner* — Michael Thier
*Assistant Examiner* — Kent Krueger
(74) *Attorney, Agent, or Firm* — JCIPRNET

(57) ABSTRACT

A communication station includes a transceiving circuit, a radio signal distribution circuit and a control circuit. The radio signal distribution circuit configures an antenna array to communication with a communication device with a first antenna port formation pattern (APFP) and a second APFP based on an elevation beamforming technique. The control circuit configures the transceiving circuit to generate a first reference signal and a second reference signal, and configures the radio signal distribution circuit to configure the antenna array to transmit the first reference signal and the second reference signal respectively with the first APFP and the second APFP to the communication device. The control circuit further configures the transceiving circuit to receive the first channel state information and the second channel state information respectively corresponding to the first reference signal and the second reference signal through the radio signal distribution circuit.

19 Claims, 4 Drawing Sheets

(56) References Cited

FOREIGN PATENT DOCUMENTS

| CN | 102045762 | 5/2011 |
|----|-----------|--------|
| CN | 102056220 | 5/2011 |
| CN | 102122976 | 7/2011 |
| CN | 102315871 | 1/2012 |
| CN | 102938688 | 2/2013 |
| WO | WO 2010/002734 A2 | 7/2010 |
| WO | WO 2013/024350 A2 | 2/2013 |

OTHER PUBLICATIONS

3rd Generation Partnership Project: Technical Specification Group Radio Access Network; Evolved Universal Terrestrial Radio Acess (E-UTRA); Physical layer procedures (Release 11), France, Feb. 2013, pp. 1-173.

Alcatel-Lucent Shanghai Bell et al., Considerations on CSI feedback enhancements for high-priority antenna configurations, 3GPP TSG-RAN WG1 #66, Anthens, Greece, Aug. 22-26, 2011.

St. Julian's et al., "On the backwards compatibility of the new carrier type", 3GPP TSG RAN WG1 Meeting #72, Feb. 2013, 1-2.

"Office Action of China Counterpart Application," issued on Aug. 22, 2017, pp 1-11, in which the listed references were cited.

\* cited by examiner

COMMUNICATION STATION WITH ELEVATION BEAMFORMING AND RELATED COMMUNICATION DEVICE

CROSS-REFERENCE TO RELATED APPLICATIONS

This application claims the benefit of priority to U.S. Provisional Application Ser. No. 61/809,434, filed on Apr. 8, 2013; the entirety of which is incorporated herein by reference for all purposes.

BACKGROUND

The disclosure generally relates to a communication system and, more particularly, to a communication station with the elevation beamforming technique and related communication devices.

In the 3rd Generation Partnership Project-Long Term Evolution (3GPP-LTE) technical specifications and other communication systems, the elevation beamforming technique is realized by utilizing the two-dimensional antenna array to control the radiation pattern on both vertical and horizontal domains for performing radio signal communications. The elevation beamforming technique may transmit the radio signal to the communication devices at different vertical positions by adjusting the downtilt angle of the radiation pattern formed by the two-dimensional antenna array. Therefore, the communication station may transmit signals to the target communication device more precisely and a better communication quality may be obtained because the transmission energy may be more concentrated at the target communication device. The signal quality may be improved and the interference on other non-target communication devices may be reduced. Moreover, the power consumption of the communication station may also be reduced accordingly.

In the conventional communication systems, however, the communication station and the communication device still do not have a suitable mechanism for configuring the two-dimensional antenna array even if the communication station utilizes the elevation beamforming technique. The elevation beamforming technique may therefore not be effectively utilized to improve the communication performance.

SUMMARY

In view of the foregoing, it may be appreciated that a substantial need exists for methods and apparatuses that mitigate or reduce the problems above.

An example embodiment of a communication station is disclosed, configured to operably configure an antenna array to communicate with a communication device with an elevation beamforming technique wherein the antenna array comprises a plurality of antenna units, comprising: a transceiving circuit; a radio signal distribution circuit, coupled with the transceiving circuit and for coupling with the antenna array, configured to operably configure the antenna array to be one of a first antenna port formation pattern (APFP) and a second APFP for communicating with the communication device; and a control circuit, coupled with the transceiving circuit and the radio signal distribution circuit, configured to operably configure the transceiving circuit to generate one or more first reference signals and configure the radio signal distribution circuit to configure the antenna array to be the first APFP for transmitting the one or more first reference signals to the communication device; configured to operably configure the transceiving circuit to generate one or more second reference signals and configure the radio signal distribution circuit to configure the antenna array to be the second APFP for transmitting the one or more second reference signals to the communication device; configured to operably configure the transceiving circuit to receive one or more first channel state information (CSI), which the communication device generates according to the one or more first reference signals, through the radio signal distribution circuit; and configured to operably configure the transceiving circuit to receive one or more second CSI, which the communication device generates according to the one or more second reference signals, through the radio signal distribution circuit; wherein the first APFP and the second APFP respectively comprise one or more antenna ports; and each of the antenna ports comprises one or more antenna units of the plurality of antenna units of the antenna array.

Another example embodiment of a communication device is disclosed, configured to operably communicate with a communicate station wherein the communication station configures an antenna array to communicate with the communication device with an elevation beamforming technique; the antenna array comprises a plurality of antenna units; the communication station configures the antenna array to be a first antenna port formation pattern for transmitting one or more first reference signals, and to be a second APFP for transmitting one or more second reference signals; and the first APFP and the second APFP respectively comprise one or more antenna ports and each of the antenna ports comprises one of more antenna units of the plurality of antenna units of the antenna array, comprising: a transceiving circuit, configured to operably receive the one or more first reference signals and the one or more second reference signals; a channel state information generating circuit, configured to operably generate one or more first CSI according to the one or more first reference signals and generate one or more second CSI according to the one or more second reference signals; and a control circuit, coupled with the transceiving circuit and the CSI generating circuit, configured to operably configure the transceiving circuit to transmit at least one of the one or more first CSI and the one or more second CSI.

Another example embodiment of a communication device is disclosed, configured to operably communicate with a communicate station wherein the communication station configures an antenna array to communicate with the communication device with an elevation beamforming technique; the antenna array comprises a plurality of antenna units; and the communication station transmits at least one of a reference signal and a physical antenna array configuration parameter, comprising: a transceiving circuit, configured to operably receive the at least one of the reference signal and the physical antenna array configuration parameter; an antenna configuration calculating circuit, configured to operably provide one or more antenna port formation pattern suggestion messages according to the at least one of the reference signal and the physical antenna array configuration parameter wherein each of the APFP suggestion messages comprises one or more antenna units of the plurality of the antenna units of the antenna array; and a control circuit, coupled with the transceiving circuit and the antenna configuration calculating circuit, configured to operably configure the transceiving circuit to transmit the one or more APFP suggestion messages to the communication station.

Another example embodiment of a communication station is disclosed, configured to operably configure an antenna array to communicate with a first communication device with an elevation beamforming technique wherein the antenna array comprises a plurality of antenna units, comprising: transceiving circuit; a radio signal distribution circuit, coupled with the transceiving circuit and for coupling with the antenna array; and a control circuit, coupled with the transceiving circuit and the radio signal distribution circuit, configured to operably configure at least part of transceiving circuit to generate a reference signal and configure the radio signal distribution circuit to configure the antenna array to transmit at least one of the reference signal and a physical antenna array configuration parameter with at part of the antenna units of the antenna array; configured to operably configure the transceiving circuit to receive one or more antenna port formation pattern suggestion messages, provided by the first communication device according to the at least one of the reference signal and the physical antenna array configuration parameter, through the radio signal distribution circuit; and configured to operably configure the transceiving circuit to generate one or more first reference signals and configure the radio signal distribution circuit to configure the antenna array to be a first APFP of the one or more APFP suggestion messages for transmitting the one or more first reference signals to the first communication device; wherein each of the APFP suggestion messages comprises one or more antenna units of the plurality of the antenna units of the antenna array.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
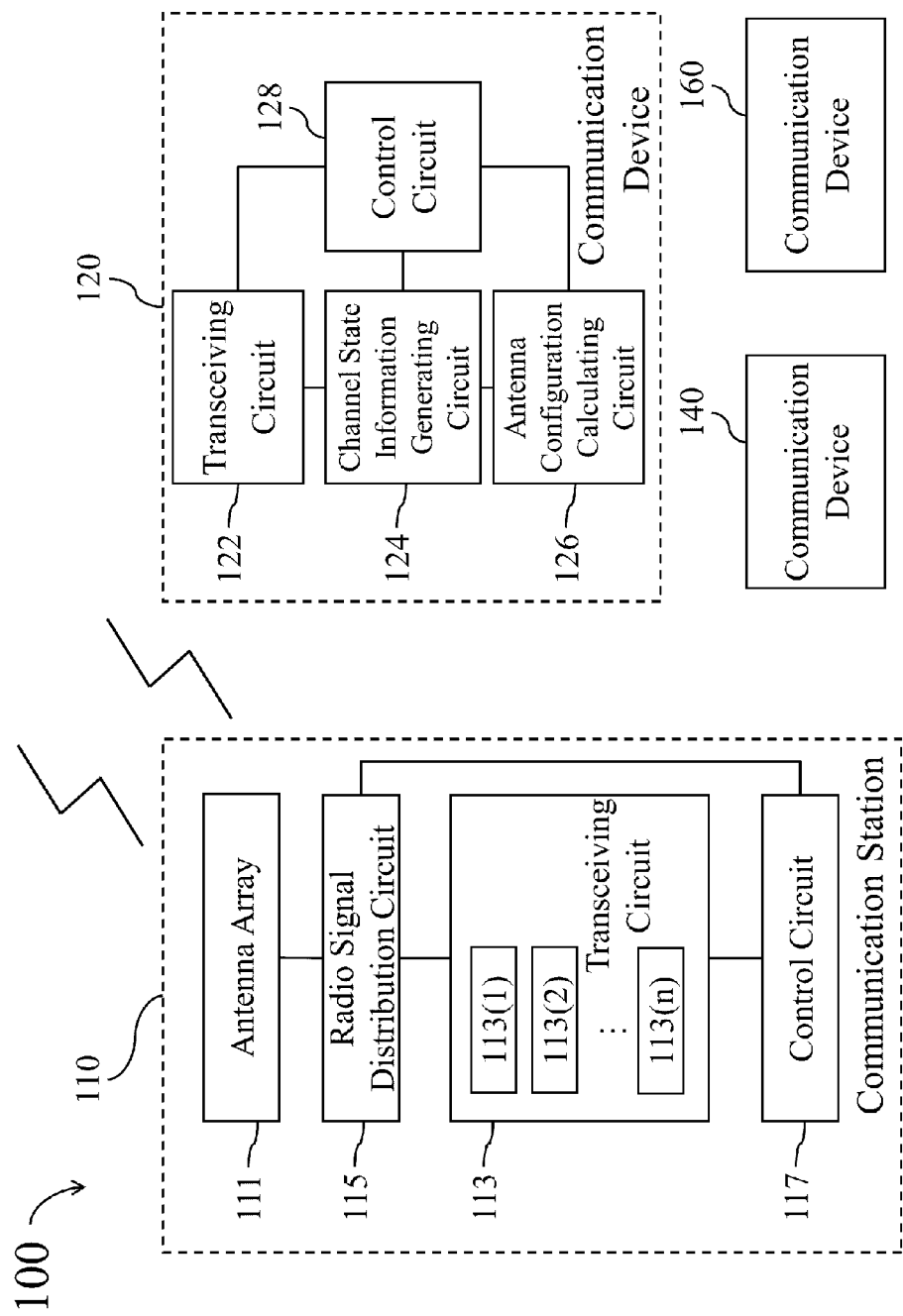
FIG. 1 shows a simplified functional block diagram of a communication system according to one embodiment of the present disclosure.

FIG. 1 shows a simplified functional block diagram of a communication system 100 according to one embodiment of the present disclosure. The communication system 100 comprises a communication station 110 and communication devices 120, 140 and 160. For the purposes of conciseness and clear explanation, other components and connections of the communication system 100 are not shown in FIG. 1.

The communication station 110 comprises an antenna array 111, transceiving circuits 113(1)-113(n), a radio signal distribution circuit 115 and control circuit 117. The communication station 110 may configure the antenna array 111 to communicate with the communication devices 120, 140 and 160 with the elevation beamforming technique.

The antenna array 111 comprises a plurality of antenna units, which may be realized with the same type or different types of antennas. The antenna array 111 may be configured to operably to be a plurality of antenna port formation patterns (APFPs) for communicating with the communication devices 120, 140 and 160. Each of the APFPs respectively comprises one or more antenna ports and each of the antenna ports comprises one or more antenna units.

Figure 2:
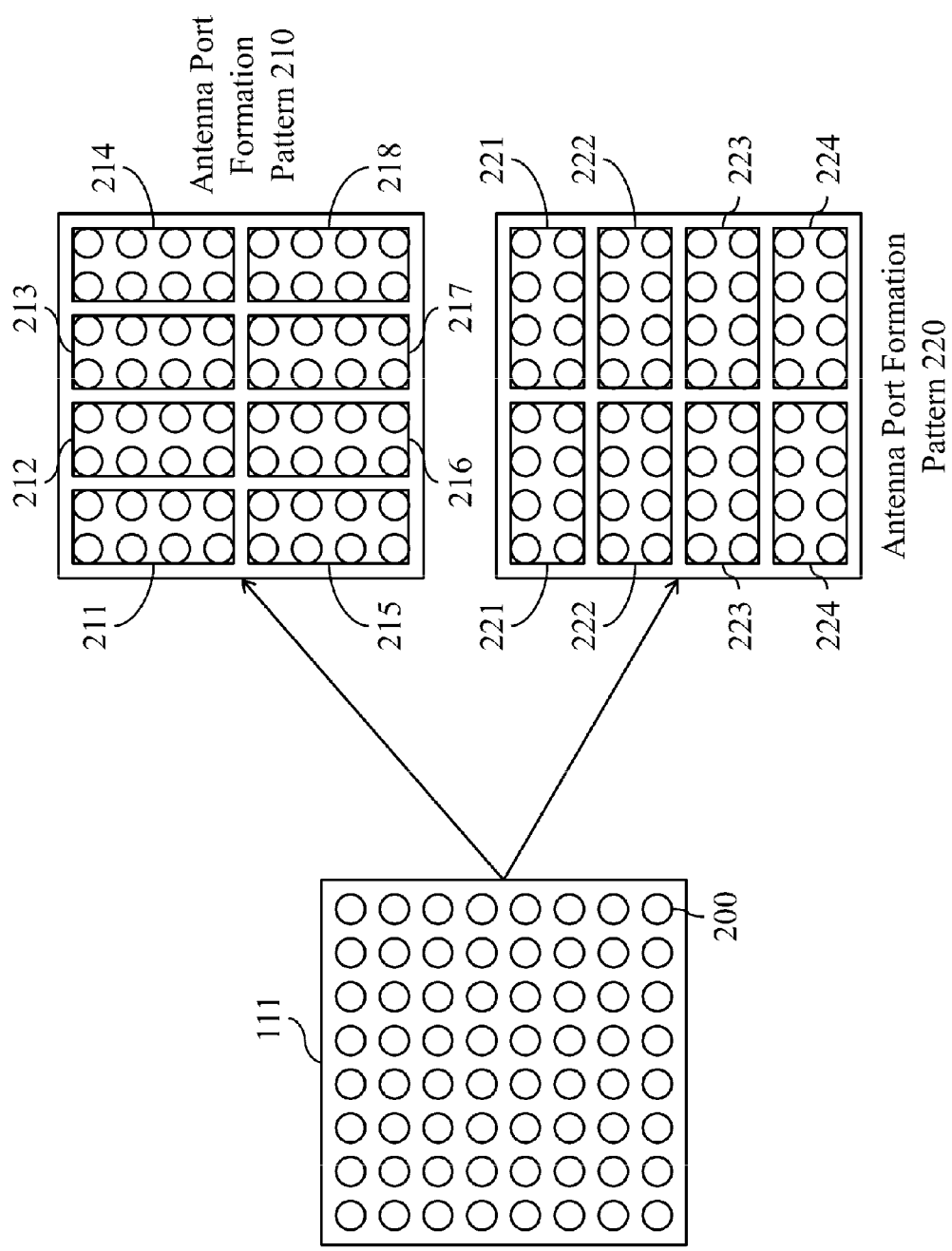
FIG. 2 shows a simplified functional block diagram of the antenna array in FIG. 1 according to one embodiment of the present disclosure.

FIG. 2 shows a simplified functional block diagram of the antenna array 111 in FIG. 1 according to one embodiment of the present disclosure. For the purposes of conciseness and clear explanation, other components and connections of the antenna array 111 are not shown in FIG. 1. In the embodiment in FIG. 2, the antenna array 111 comprises sixty-four antenna units 200, and may be configured to be at least a first APFP 210 and a second APFP 220.

The APFP 210 comprises eight antenna ports 211-218, each of which comprises eight antenna units 200. The APFP 220 comprises eight antenna ports 221-228, each of which comprises eight antenna units 200.

In other embodiments, the number of antenna units of the antenna array 111, the number of antenna ports in each APFPs and the number of the antenna units of each antenna ports in each APFPs may be respectively configured according to different design considerations and environments. For example, in other embodiments, the antenna array 111 may be configured to an APFP with an antenna port which comprises sixty-four antenna units, another APFP with sixty-four antenna ports each of which comprises one antenna units, etc. Moreover, the antenna ports may respectively comprises the same or different number of antenna units.

One or more transceiving circuits 113(1)-113(n) may be collectively referred to the transceiving circuit 113 hereinafter wherein n is a suitable positive integer. The transceiving circuit 113 may comprise a modulation circuit, a demodulation circuit, a signal generating circuit, analog signal processing circuits, digital signal processing circuits, etc. for transmitting and receiving signals (e.g., reference signals and physical antenna array configuration parameters) with the communication devices 120, 140 and 160.

The radio signal distribution circuit 115 is coupled with the transceiving circuit 113 and the antenna array 111 for configuring the antenna array 111 to be the suitable APFP for communicating with the communication device 120, 140 and 160.

The control circuit 117 is coupled with the transceiving circuit 113 and the radio signal distribution circuit 115. The control circuit 117 may configure the transceiving circuit 113 to generate reference signals and configure the radio signal distribution circuit 115 to configure the antenna array 111 to be a suitable APFP for transmitting the reference signals to the communication devices 120, 140 and 160. The control circuit 117 may also configure the transceiving circuit 113 to receive the channel state information, which are generated by the communication devices 120, 140 and/or 160 according to the references signals, through the radio signal distribution circuit 115.

The communication station 110 may be realized with a node B device, an evolved node B device or other suitable base stations.

Moreover, one or more components of the communication station 110 may be integrated or respectively realized with one or more circuit elements, e.g., microprocessors, network processors, analog signal processing circuits and digital signal processing circuits. For example, the transceiving circuit 113, the radio signal distribution circuit 115 and the control circuit 117 may be realized in an integrated circuit package for coupling with the antenna array 111.

The communication device 120 comprises a transceiving circuit 122, a channel state information (CSI) generating circuit 124, an antenna configuration calculating circuit 126 and a control circuit 128 for communicating with the communication station 110.

The transceiving circuit 122 may comprises a modulation circuit, a demodulation circuit, a signal generating circuit, analog signal processing circuits, digital signal processing circuits, etc. for receiving the reference signals or other signals form the communication station 110 and transmitting signals to the communication station 110.

The CSI generating circuit 124 is configured to operably generate the CSI according to the reference signal(s) transmitted by the communication station 110.

The antenna configuration calculating circuit 126 is configured to operably provide one or more APFP suggestion messages according to at least one of the reference signal and the physical antenna array configuration parameter transmitted by the communication station 110. Each of the APFP suggestion messages comprises one or more antenna units of the antenna array 111.

The control circuit 128 is configured to operably couple with the transceiving circuit 122, the CSI generating circuit 124 and the antenna configuration calculating circuit 126. The control circuit 128 is configured to operably configure the transceiving circuit 122 to transmit the CSI, the physical antenna array configuration parameter, etc.

Moreover, one or more components of the communication device 120 may be integrated or respectively realized with one or more circuit elements, e.g., microprocessors, network processors, analog signal processing circuits and digital signal processing circuits. For example, the transceiving circuit 122, the CSI generating circuit 124, the antenna configuration calculating circuit 126 and the control circuit 128 may be realized in an integrated circuit package.

The communication devices 140 and 160 may be respectively realized with the same or similar structures with the communication device 120 for communicating with the communication statin 110. The communication devices 120, 140 and 160 may be respectively realized with mobile phones, tablet computers, portable devices or other suitable user equipment.

Figure 3:
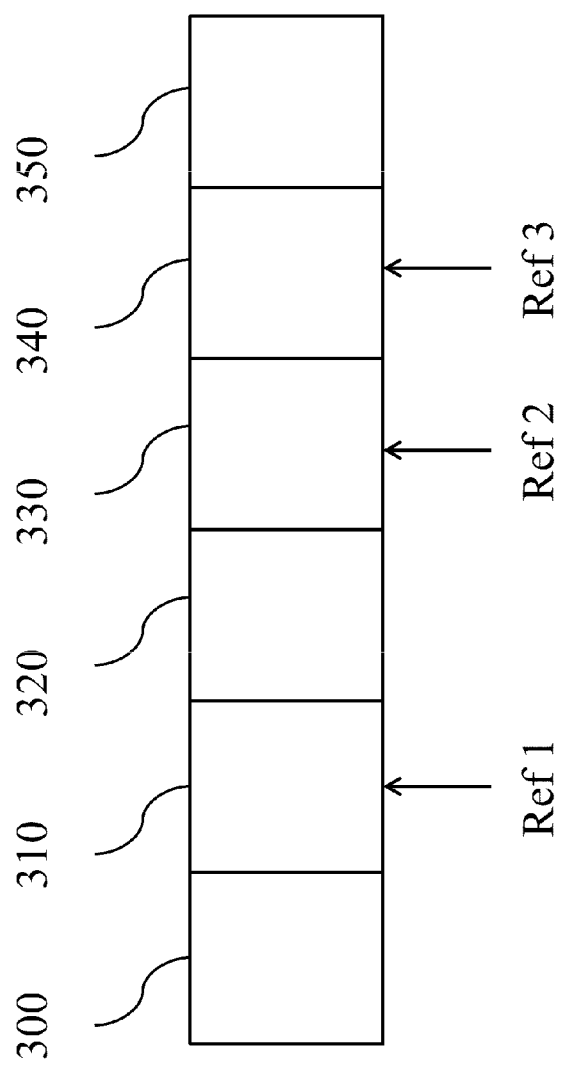
FIG. 3 shows a simplified schematic diagram of radio resources utilized in the communication system in FIG. 1 according to one embodiment of the present disclosure.

FIG. 3 shows a simplified schematic diagram of radio resources 300-350 utilized in the communication system 100 in FIG. 1 according to one embodiment of the present disclosure.

A radio resource may be configured to be a certain amount of data transmitted in a predetermined frequency band in a predetermined time. For example, the radio resource may be configured to be a radio frame comprising 1200 subcarriers in frequency and 10 ms in time. The radio resource may also be configured to be at least part of the radio frame, the subframe, the slot, the radio block and the OFDM symbol in the 3GPP communication system.

The operations between the communication station 110 and the communication device 120 are utilized in the following description. The operations between the communication station 110 and the communication devices 140 and 160 may adopt the same or similar mechanisms according to the embodiments below.

In one embodiment, the control circuit 117 of the communication station 110 configures at least part of the transceiving circuit 113 (e.g., transceiving circuits 113(i)-113(j), i and j are suitable numbers between 1 and n) to generate one or more first reference signals Ref1. The control circuit 117 further configures the radio signal distribution circuit 115 to configure the antenna array 111 to be the first APFP 210 for transmitting the one or more first reference signals Ref1 to the communication device 120 in the radio resource 310 by utilizing one or more antenna ports of the antenna ports 211-218. The control circuit 117 configures at least part of the transceiving circuit 113 to generate one or more second reference signals Ref2. The control circuit 117 further configures the radio signal distribution circuit 115 to configure the antenna array 111 to be the second APFP 220 for transmitting the one or more second reference signals Ref2 to the communication device 120 in the radio resource 330 by utilizing one or more antenna ports of the antenna ports 221-228. The control circuit 117 configures at least part of the transceiving circuit 113 to generate one or more third reference signals Ref3. The control circuit 117 further configures the radio signal distribution circuit 115 to configure the antenna array 111 to be a third APFP (not shown in FIG. 2) for transmitting the one or more third reference signals Ref3 to the communication device 120 in the radio resource 340 by utilizing one or more antenna ports of the antenna ports in the third APFP.

The transceiving circuit 122 of the communication device 120 receives the one or more first reference signals Ref1, the one or more second reference signals Ref2 and the one or more third reference signals Ref3. The CSI generating circuit 124 generates one or more first channel state information CSI1 according to the one or more first reference signals Ref1, one or more second channel state information CSI2 according to the one or more second reference signals Ref2, and one or more third channel state information CSI3 according to the one or more third reference signals Ref3.

In other embodiments, the communication station 110 may transmit one or more the same or different reference signals with the same or different APFPs so that the communication device 120 may generate corresponding CSI according to the references signals. Thus, the communication station 110 may adjust the operations of the communication station 110 and/or the communication device 120 according to the CSI, e.g., adjusting the APFP of the antenna array 111 for communications between the communication station 110 and the communication device 120. For example, in the 3GPP communication system, the channel state information CSI1, CSI2 and CSI3 may respectively comprise one or more rank indicators (RIs), one or more precoding matrix indicators (PMIs) and one or more channel quality indicators (CQIs). The communication station 110 may transmit a plurality of the same or different reference signals respectively in a periodic manner or in an aperiodic manner.

Figure 4:
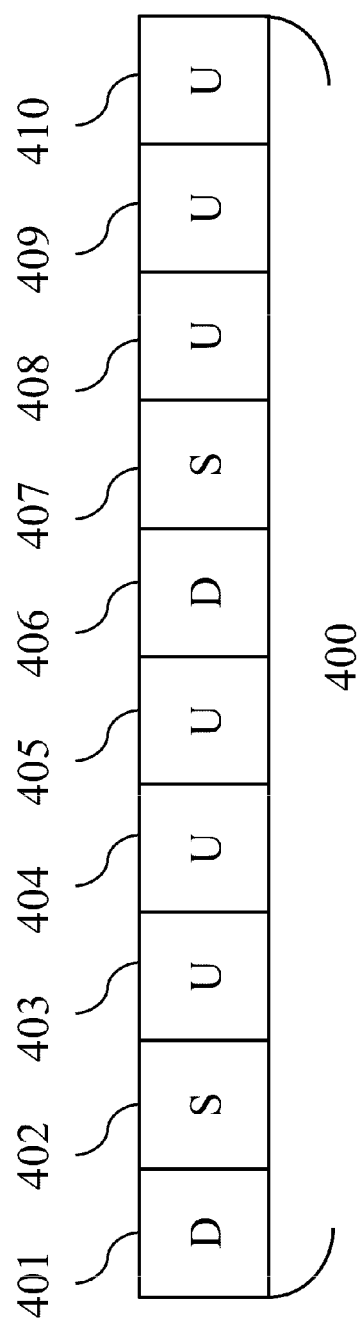
FIG. 4 shows a simplified schematic diagram of radio resources utilized by the communication device in FIG. 1 for reporting the channel stat information to the communication station according to one embodiment of the present disclosure.

FIG. 4 shows a simplified schematic diagram of radio resources utilized by the communication device 120 in FIG. 1 for reporting the CSI to the communication station 110 according to one embodiment of the present disclosure. The radio resources in FIGS. 3 and 4 may be configured to be the same or different according to different design considerations.

In the embodiment in FIG. 4, the communication device 120 utilizes a plurality of subframes in a plurality of radio frames for transmitting the CSI to the communication station 110. The radio frame 400 comprises ten subframes 401-410. In FIG. 4, a downlink subframe for the communication station 110 to transmit downlink signals to the communication device 120 is denoted with a letter "D". An uplink subframe for the communication device 120 to transmit uplink signals to the communication station 110 is denoted with a letter "U". A special subframe positioned between the downlink subframe and the uplink subframe is denoted with a letter "S".

In one embodiment, the communication device 120 may periodically transmit each of the channel state information CSI1, CSI2 and CSI3 to the communication station 110 with the same period. For example, the control circuit 128 of the communication station 120 may configure the transceiving circuit 122 to transmit the channel state information CSI1 in one or more subframes 402 of one or more radio frames 400, the channel state information CSI2 in one or more subframes 403 of one or more radio frames 400, and the channel state information CSI3 in one or more subframes 408 of one or more radio frames 400.

In another embodiment, the communication device 120 may periodically transmit each of the channel state information CSI1, CSI2 and CSI3 to the communication station 110 respectively with at least one different period. For example, the control circuit 128 of the communication station 120 may configure the transceiving circuit 122 to may transmit the channel state information CSI1 in subframes 402 and 407 of one or more radio frames 400, the channel state information CSI2 in subframes 403 and 404 of one or more radio frames 400, and the channel state information CSI3 in one or more subframes 408 of one or more radio frames 400.

In another embodiment, the communication device 120 may aperiodically transmit each of the channel state information CSI1, CSI2 and CSI3 to the communication station 110. For example, the control circuit 128 of the communication station 120 may configure the transceiving circuit 122 to transmit the channel state information CSI1 first, transmit the channel state information CSI2 after finishing the transmission of the channel state information CSI1, and transmit the channel state information CSI3 after finishing the transmission of the channel state information CSI2.

In other embodiments, the communication device 120 may transmit the channel state information to the communication station 110 in other suitable periodic or aperiodic manners.

In other embodiment, the communication device 120 may transmit only part of the channel state information CSI1, CSI2 and CSI3 according to a predetermined rule. For example, the predetermined rule may be transmitted from the communication station 110 by utilizing the higher layer signaling (e.g., the radio resource control message, the RRC message) to the communication device 120. The predetermined rule may also be stored in the memory unit (not shown in FIG. 1) of the communication device 120 in advance.

In one embodiment, the communication device 120 may only allowed to transmit two of the channel state information with the best channel quality according to the predetermined rule. For example, the control circuit 128 of the communication station 120 may configure the transceiving circuit 122 to transmit only the channel state information CSI1 and CSI3 with the best channel quality according to the CQI of the channel state information. In other embodiments, the communication device 120 may transmit only one or other suitable number of the channel state information with the best channel quality according to the predetermined rule. For example, the control circuit 128 of the communication station 120 may configure the transceiving circuit 122 to transmit only the channel state information CSI1 with the best channel quality according to the CQI of the channel state information.

In other embodiments, the communication device 120 may transmit the channel state information required by the communication station 110 according to the configuration of the communication station 110. For example, the communication station 110 may transmit one or more reporting set configuration messages by utilizing the higher layer signaling (e.g., the RRC message) to the communication device 120. Each of the reporting set configuration messages indicates the grouping of CSI in one or more the reporting sets. The control circuit 128 configures the transceiving circuit 122 to transmit one or more reporting sets of CSI according to the one or more reporting set configuration messages. Each of the reporting sets of CSI comprises one or more channel state information generated by the CSI generating circuit 124 according to one or more reference signals which the communication station 110 transmits respectively with one or more APFPs. The communication station 110 may configures the communication device 120 to transmit the required reporting set(s) of CSI by utilizing the physical layer signaling.

For example, in the reporting set configuration message transmitted by the communication station 110, a signaling of "0" indicates the communication device 120 not to transmit any channel state information, a signaling of "1" indicates the communication device 120 to transmit the channel state information CSI2 and CSI3, a signaling of "2" indicates the communication device 120 to transmit the channel state information CSI1 and CSI3, and a signaling of "3" indicates the communication device 120 to transmit the channel state information CSI1, CSI2 and CSI3.

In the above embodiment, the communication station 110 may configure the antenna array 110 to a suitable APFP according to the CSI received from the communication devices 120, 140 and/or 160, and therefore improve the communication performance. In other embodiments, the communication station 110 and the communication devices 120, 140 and 160 may also determine the suitable APFP for performing communications according to other mechanisms.

For example, in one embodiment, the control circuit 117 of the communication station 110 may configure at least part of the transceiving circuit 113 (e.g., transceiving circuits 113($i$)-113($j$), i and j are suitable numbers between 1 and n) to generate a reference signal and configure the radio signal distribution circuit 115 to configure the antenna array to transmit at least one of the reference signal and the physical antenna array configuration parameter with at least part of the antenna units of the antenna array 111. The physical antenna array configuration parameter may comprise at least one of a number of the antenna units of the antenna array 111, one or more spacings between the antenna units of the antenna array 111, and a spatial correlation structure of the antenna units of the antenna array 111.

The antenna configuration calculating circuit 126 of the communication device 120 may provide one or more APFP suggestion messages according to the at least one of the reference signal and the physical antenna array configuration parameter of the antenna array 111. Each of the APFP suggestion messages comprises one or more antenna units of the antenna units of the antenna array. The control circuit 117 of the communication station 110 configures at least part of the transceiving circuit 113 to receive the one or more APFP suggestion messages provided by the communication device 120 through the radio signal distribution circuit 115. The control circuit 117 may therefore configure the radio signal distribution circuit 115 to configure the antenna array 113 to be a suitable APFP according to the one or more APFP suggestion messages for transmitting reference signals or other signals to the communication device 120.

The antenna configuration calculating circuit 126 of the communication device 120 may also provide one or more APFP suggestion messages by choosing from a predetermined set of APFP suggestion messages according to the at least one of the reference signal and the physical antenna array configuration parameter. Therefore, the control circuit 117 may therefore configure the radio signal distribution circuit 115 to configure the antenna array 113 to be a suitable APFP according to the one or more APFP suggestion messages for transmitting reference signals or other signals to the communication device 120. For example, the predetermined set of APFP suggestion messages may be transmitted from the communication station 110 by utilizing the higher layer signaling (e.g., the RRC message) to the communication device 120. The predetermined set of APFP suggestion messages may also be stored in the memory unit (not shown in FIG. 1) of the communication device 120 in advance.

The control circuit 128 of the communication device 120 configures the transceiving circuit 122 to transmit the one or more APFP suggestion messages to the communication station 110. Thus, the control circuit 117 may configure the radio signal distribution circuit 115 to configure the antenna array 113 to be a suitable APFP according to the one or more APFP suggestion messages. Moreover, the control circuit 117 of the communication station 110 may configure the radio signal distribution circuit 115 to configure the antenna array 11 to be a suitable APFP according to one or more APFP suggestion messages transmitted from at least one of the communication devices 120, 140 and 160. For example, the control circuit 117 of the communication station 110 may configure the radio signal distribution circuit 115 to configure the antenna array 11 to be an APFP, which has better communication quality for all of the communication devices 120, 140 and 160, according to the APFP suggestion messages transmitted from the communication devices 120, 140 and 160.

In the above embodiments, the antenna configuration calculating circuit 126 of the communication device 120 may generate a plurality of channel responses of at least part of the antenna units of the antenna array 111 according to the reference signal transmitted by the communication station 110, and provides one or more APFP suggestion messages according to the channel responses. In the above embodiments, the antenna configuration calculating circuit 126 of the communication device 120 may also provide one or more APFP suggestion messages according to the spatial correlation structure of the antenna units of the antenna array 111.

Therefore, the communication station and the communication devices may choose an appropriate APFP to effectively utilize the antenna array for performing the elevation beamforming technique according to the above embodiments. The communication quality and the system performance may be improved accordingly.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A communication station, configured to operably configure an antenna array to communicate with a communication device with an elevation beamforming technique wherein the antenna array comprises a plurality of physical antenna elements, comprising:

a transceiving circuit;

a radio signal distribution circuit, coupled with the transceiving circuit and for coupling with the antenna array, configured to operably configure the antenna array to be one of a first antenna port formation pattern (APFP) and a second APFP for communicating with the communication device; and a control circuit, coupled with the transceiving circuit and the radio signal distribution circuit, configured to operably configure the transceiving circuit to generate one or more first reference signals and configure the radio signal distribution circuit to configure the antenna array to be the first APFP for transmitting the one or more first reference signals to the communication device; configured to operably configure the transceiving circuit to generate one or more second reference signals and configure the radio signal distribution circuit to configure the antenna array to be the second APFP for transmitting the one or more second reference signals to the communication device; configured to operably configure the transceiving circuit to receive one or more first channel state information (CSI), which the communication device generates according to the one or more first reference signals, through the radio signal distribution circuit; and configured to operably configure the transceiving circuit to receive one or more second CSI, which the communication device generates according to the one or more second reference signals, through the radio signal distribution circuit, wherein the first APFP comprises a plurality of physical antenna elements grouped into a first plurality of antenna ports which comprises a first antenna port, the second APFP comprises a plurality of physical antenna elements grouped into a second plurality of antenna ports which comprises a second antenna port and a third antenna port, wherein in response to switching from the first APFP to the second APFP, the physical antenna elements of the first antenna port is configured into at least the second antenna port and the third antenna port, wherein the control circuit configures the transceiving circuit to receive one of the one or more first CSI and the one or more second CSI with the best channel quality transmitted by the communication device, then configures the antenna array to be the first APFP according to the one or more first CSI received and configures the antenna array to be the second APFP according to the one or more second CSI received, wherein the control circuit configures the transceiving circuit to transmit to the communication device a reporting set configuration message which comprises a signaling, the signaling indicates the communication device not to transmit any of the CSI according to a first state of the signaling, to transmit the one or more first CSI according to a second state of the signaling, to transmit the one or more second CSI according to a third state of the signaling, and to transmit both of the one or more first CSI and the one or more second CSI according to a fourth state of the signaling.

2. The communication station of claim 1, wherein the control circuit configures the transceiving circuit to receive the one or more first CSI and the one or more second CSI with different periods.

3. The communication station of claim 1, wherein the communication device transmits at least one of the one or more first CSI and the one or more second CSI aperiodically; and the control circuit configures the transceiving circuit to receive the aperiodically transmitted at least one of the one or more first CSI and the one or more second CSI.

4. The communication station of claim 1, wherein the control circuit configures the communication device to transmit one or more reporting sets of CSI; each of the reporting set of CSI comprises one or more CSI which the communication device generates according to one or more reference signals which the communication station transmits respectively with one or more APFPs; and the control circuit configures the transceiving circuit to receive the one or more reporting sets of CSI.

5. The communication station of claim 1, wherein a quantity of physical antenna elements of the first antenna port of the first APFP in a first direction is greater than a quantity of physical antenna elements of the first antenna port of the first APFP in a second direction of the antenna array, and a quantity of physical antenna elements of the second antenna port of the second APFP in the first direction is less than a quantity of physical antenna elements of the second antenna port of the second APFP in the second direction of the antenna array.

6. A communication device, configured to operably communicate with a communicate station wherein the communication station configures an antenna array to communicate with the communication device with an elevation beamforming technique; the antenna array comprises a plurality of physical antenna elements; the communication station configures the antenna array to be a first antenna port formation pattern (APFP) for transmitting one or more first reference signals, and to be a second APFP for transmitting one or more second reference signals, wherein the first APFP comprises a plurality of physical antenna elements grouped into a first plurality of antenna ports which comprises a first antenna port, and the second APFP comprises a plurality of physical antenna elements grouped into a second plurality of antenna ports which comprises a second antenna port and a third antenna port, wherein in response to switching from the first APFP to the second APFP, the physical antenna elements of the first antenna port is configured into at least the second antenna port and the third antenna port, comprising:

a transceiving circuit, configured to operably receive the one or more first reference signals and the one or more second reference signals;

a channel state information (CSI) generating circuit, configured to operably generate one or more first CSI according to the one or more first reference signals and generate one or more second CSI according to the one or more second reference signals; and a control circuit, coupled with the transceiving circuit and the CSI generating circuit, configured to operably configure the transceiving circuit to transmit at least one of the one or more first CSI and the one or more second CSI, wherein the control circuit configures the transceiving circuit to transmit only one of the one or more first CSI and the one or more second CSI with the best channel quality, wherein the control circuit configures the transceiving circuit to transmit to the communication device a reporting set configuration message which comprises a signaling, the signaling indicates the communication device not to transmit any of the CSI according to a first state of the signaling, to transmit the one or more first CSI according to a second state of the signaling, to transmit the one or more second CSI according to a third state of the signaling, and to transmit both of the one or more first CSI and the one or more second CSI according to a fourth state of the signaling.

7. The communication device of claim 6, wherein the control circuit configures the transceiving circuit to transmit the one or more first CSI and the one or more second CSI with different periods.

8. The communication device of claim 6, wherein the control circuit configures the transceiving circuit to aperiodically transmit at least one of the one or more first CSI and the one or more second CSI.

9. The communication device of claim 6, wherein transceiving circuit receives a reporting set configuration message from the communication station; the control circuit configures the transceiving circuit to transmit one or more reporting sets of CSI according to the reporting set configuration message; and each of the reporting set of CSI comprises one or more CSI generated by the CSI generating circuit according to one or more reference signals which the communication station transmits respectively with one or more APFPs.

10. The communication device of claim 6, wherein a quantity of physical antenna elements of the first antenna port of the first APFP in a first direction is greater than a quantity of physical antenna elements of the first antenna port of the first APFP in a second direction of the antenna array, and a quantity of physical antenna elements of the second antenna port of the second APFP in the first direction is less than a quantity of physical antenna elements of the second antenna port of the second APFP in the second direction of the antenna array.

11. A communication device, configured to operably communicate with a communicate station wherein the communication station configures an antenna array to communicate with the communication device with an elevation beamforming technique; the antenna array comprises a plurality of physical antenna elements; the communication station configures the antenna array to be a plurality of antenna port formation patterns (APFPs), wherein a first APFP of the APFPs comprises a plurality of physical antenna elements grouped into a first plurality of antenna ports which comprises a first antenna port, and a second APFP of the APFPs comprises a plurality of physical antenna elements grouped into a second plurality of antenna ports which comprises a second antenna port and a third antenna port, wherein in response to switching from the first APFP to the second APFP, the physical antenna elements of the first antenna port is configured into at least the second antenna port and the third antenna port; and the communication station transmits at least one of a reference signal and a physical antenna array configuration parameter, comprising:
- a transceiving circuit, configured to operably receive the at least one of the reference signal and the physical antenna array configuration parameter;
- an antenna configuration calculating circuit, configured to operably provide one or more antenna port formation pattern (APFP) suggestion messages according to the at least one of the reference signal and the physical antenna array configuration parameter wherein each of the APFP suggestion messages comprises one or more physical antenna elements of the plurality of the physical antenna elements of the antenna array; and
- a control circuit, coupled with the transceiving circuit and the antenna configuration calculating circuit, configured to operably configure the transceiving circuit to transmit the one or more APFP suggestion messages to the communication station,
- wherein the physical antenna array configuration parameter comprises at least one of a quantity of the antenna units of the antenna array, a spacing between any two of the antenna units of the antenna array, and a spatial correlation structure of the antenna units of the antenna array.

12. The communication device of claim 11, wherein the antenna configuration calculating circuit generates a plurality of channel responses of at least part of the plurality of physical antenna elements of the antenna array according to the reference signal, and provides a first APFP suggestion message comprising the one or more physical antenna elements of the plurality of the physical antenna elements of the antenna array according to the plurality of channel responses.

13. The communication device of claim 11, wherein the antenna configuration calculating circuit provides a second APFP suggestion message comprising the one or more physical antenna elements of the plurality of the physical antenna elements of the antenna array according to the spatial correlation structure of the plurality of the physical antenna elements of the antenna array.

14. The communication device of claim 11, wherein the antenna configuration calculating circuit provides the one or more APFP suggestion messages by choosing from a predetermined set of APFP suggestion messages according to the at least one of the reference signal and the physical antenna array configuration parameter.

15. A communication station, configured to operably configure an antenna array to communicate with a first communication device with an elevation beamforming technique wherein the antenna array comprises a plurality of physical antenna elements, comprising:
- a transceiving circuit;
- a radio signal distribution circuit, coupled with the transceiving circuit and for coupling with the antenna array; and
- a control circuit, coupled with the transceiving circuit and the radio signal distribution circuit, configured to operably configure the transceiving circuit to generate a reference signal and configure the radio signal distribution circuit to configure the antenna array to transmit at least one of the reference signal and a physical antenna array configuration parameter with at least part of the physical antenna elements of the antenna array; configured to operably configure the transceiving circuit to receive one or more antenna port formation pattern (APFP) suggestion messages, provided by the first communication device according to the at least one of the reference signal and the physical antenna array configuration parameter, through the radio signal distribution circuit; configured to operably configure the transceiving circuit to generate one or more first reference signals and configure the radio signal distribution circuit to configure the antenna array to be a first APFP of the one or more APFP suggestion messages for transmitting the one or more first reference signals to the first communication device; configured to operably configure the transceiving circuit to generate one or more second reference signals and configure the radio signal distribution circuit to configure the antenna array to be a second APFP of the one or more APFP suggestion messages for transmitting the one and more second reference signals to the first communication device,
- wherein the first APFP comprises a plurality of physical antenna elements grouped into a first plurality of antenna ports which comprises a first antenna port, and the second APFP comprises a plurality of physical antenna elements grouped into a second plurality of antenna ports which comprises a second antenna port and a third antenna port, wherein in response to switching from the first APFP to the second APFP, the physical antenna elements of the first antenna port is configured into at least the second antenna port and the third antenna port,
- wherein each of the APFP suggestion messages comprises one or more physical antenna elements of the plurality of the physical antenna elements of the antenna array,
- wherein the physical antenna array configuration parameter comprises at least one of a quantity of the antenna units of the antenna array, a spacing between any two of the antenna units of the antenna array, and a spatial correlation structure of the antenna units of the antenna array.

16. The communication station of claim 15, wherein the first communication device generates a plurality of channel responses of at least part of the plurality of physical antenna elements of the antenna array according to the reference signal, and provides a first APFP suggestion message comprising the one or more physical antenna elements of the plurality of the physical antenna elements of the antenna array according to the plurality of channel responses.

17. The communication station of claim 15, wherein the first communication device provides the one or more APFP suggestion message by choosing from a predetermined set of APFP suggestion messages according to the at least one of the reference signal and the physical antenna array configuration parameter.

18. The communication station of claim 15, wherein the control circuit configures the radio signal distribution circuit to configure the antenna array to be the first APFP for transmitting the one or more first reference signals to the first communication device and transmitting one or more second reference signals to one or more second communication devices according to the one or more APFP suggestion messages of the first communication device and according to one or more APFP suggestion messages of the one or more second communications devices.

19. The communication station of claim 1, wherein the communication station is configured to switch from the first APFP to the second APFP when the reference signals for transmitting to the communication device are switched from the one or more first reference signals to the one or more second reference signals.

\* \* \* \* \*